J. C. SHARP.
BUSHING FOR TROLLEY WHEELS, PULLEYS, &c.
APPLICATION FILED FEB. 29, 1912.

1,113,143.

Patented Oct. 6, 1914.

Witnesses
Inventor
J. C. Sharp.
By C. J. Stockman
Attorney

UNITED STATES PATENT OFFICE.

JOHN CESSNA SHARP, OF CHATTANOOGA, TENNESSEE.

BUSHING FOR TROLLEY-WHEELS, PULLEYS, &c.

1,113,143.   Specification of Letters Patent.   Patented Oct. 6, 1914.

Application filed February 29, 1912. Serial No. 680,701.

*To all whom it may concern:*

Be it known that I, JOHN CESSNA SHARP, a citizen of the United States, residing at Chattanooga, in the county of Hamilton and State of Tennessee, have invented new and useful Improvements in Bushings for Trolley-Wheels, Pulleys, &c., of which the following is a specification.

This invention relates to wheels, pulleys and the like having chambers for lubricating material, and particularly to the bushings thereof, of that type which are designed to cause the lubricating material to pass to the surfaces which are to be lubricated in such a manner as to cause said surfaces to receive the proper amount of lubricant without waste of the latter.

The type of wheels, pulleys and the like with which the present invention particularly concerns itself may be called, and sometimes are referred to as being, self lubricating.

The purpose of the invention is to provide a bushing having inserts of wood, graphite, leather or other suitable material, which will be free from objections hitherto noted against the bushings of this style.

Particularly is it the purpose of the present invention to provide a bushing of the type stated, whose inserts cannot get loose or drop out of the bushing and will not unduly retard the delivery of the lubricating material which is fed thereby to the shaft, pin or other part upon which the bushing is mounted.

Figure 1:
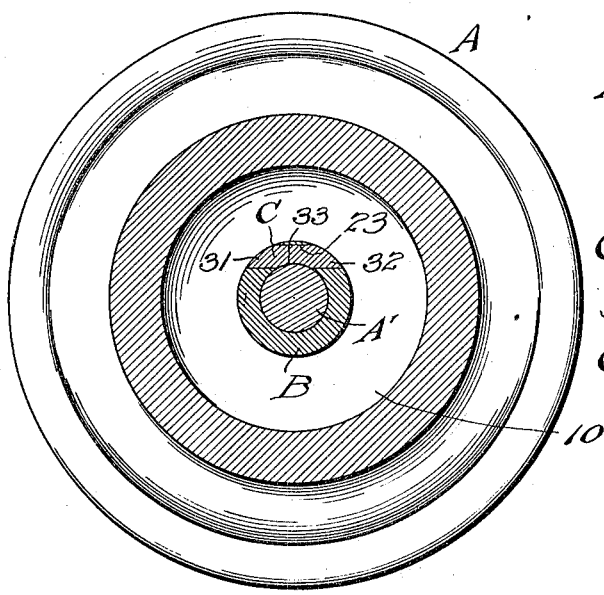
Figure 2:
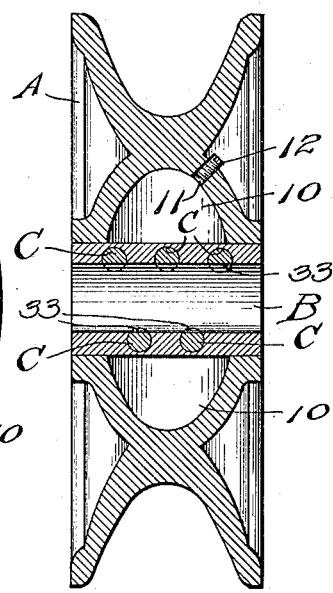
Figure 3:
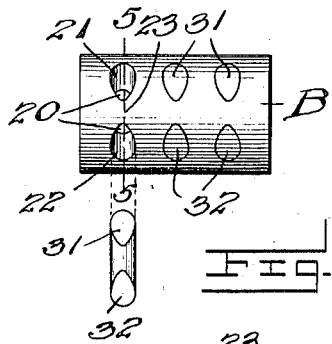
Figure 4:
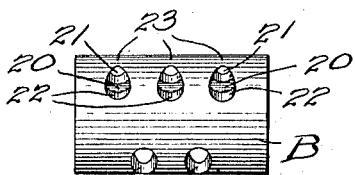
Figure 5:
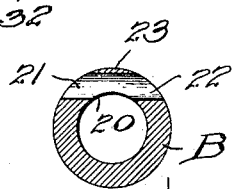
Figure 6:
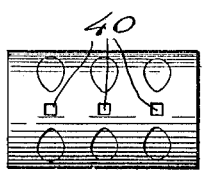

In the accompanying drawings illustrating the preferred construction of the bushing and a very desirable application thereof: Figure 1 is a vertical section of a trolley wheel embodying the present improved bushing, the section being taken on a line transverse of the shaft or pin upon which the wheel is mounted. Fig. 2 is a section of the wheel on a plane at right angles to that of Fig. 1. Fig. 3 is a detail representation of the bushing with one of the inserts separated therefrom; the bushing being viewed from the side which discloses one of the series of transverse bores. Fig. 4 is a detail representation of the bushing viewed from a position at an angle to that of Fig. 3, and shows corresponding ends of two series of transverse bores. Fig. 5 is a cross section through the bushing on a plane extending longitudinally through one of the transverse bores, on the line 5—5 of Fig. 3 for example, the feeder or insert being omitted. Fig. 6 is a detail view of a modification.

I have selected a trolley wheel, marked A in the drawings, as one suitable to exemplify the present invention, but it will be understood that the invention may be embodied in many different types of wheels, and in pulleys and other parts of machinery, apparatus or devices wherein a bushing of the present construction may desirably be employed. For this reason, the present invention is intended to be of broad application and the illustrated embodiment thereof in a trolley wheel is intended to be merely exemplary of one of a number of different suitable applications thereof.

The trolley wheel A is provided with a chamber 10 constituting a reservoir for the lubricating material, which usually is oil. In practice, it has any suitable means by which the lubricating material may be introduced into said chamber, such, for example, as the feed aperture 11 having a screw plug 12, or other suitable closure therefor. The chamber 10 is open toward the shaft of the wheel, and within said axis there is fixedly mounted a hollow bushing B through which extends the shaft or pin, A', upon which the wheel is rotatably mounted. This bushing may be made of any suitable material. It is provided with a suitable number of transverse bores, which are disposed therein substantially tangentially to the shaft when the parts are assembled, and each of said transverse bores forms a chamber for the reception of an insert or feeder C. Each of these bores extends through the inner wall of the bushing so as to be open throughout a part of its length to the longitudinal opening or bore of the bushing, as shown most clearly at 20, Fig. 5, and is open at each end, at the circumference of the bushing, to the chamber 10, as shown best at 21 and 22 in Figs. 3 and 5, the circumferential outer wall of the bushing being left intact between said open ends 21 and 22, as shown at 23. Each bore is provided, as stated, with an insert or feeder C, which is made of wood, graphite, leather or other suitable material, wood cut longitudinally of the grain being preferred. Each feeder has its ends 31 and 32 presented to the chamber 10, whereby it becomes saturated by the lubricating material in the latter, and its inner surface is concave at 33 for a part of its length to conform to the shape of the pin or shaft A'. Its concave portion is of such length that it is in contact with the shaft or pin throughout a very material part of the surface of the latter.

It will be apparent from the foregoing that each of the feeders is effectively held against longitudinal displacement by reason of the fact that it partially encircles the shaft or pin and is held against the latter by the portion 23 of the wall of the bushing. It will also be noted that the correlation of the parts is such that each feeder absorbs the lubricant from each of its ends and feeds the material to the shaft from a more extended surface than is the case where the lubricating material reaches the bearing from the end of the feeder or insert: and it further will be apparent that a feeder made of wood cut with the grain, or of other material which permits the lubricant to pass therethrough more freely in a direction longitudinally of the insert than transversely thereof, does not when the parts are correlated as herein shown, secure the advantage of the maintenance of the feeder in the bore at the expense of a proper feeding of the lubricant to the shaft or pin.

In practice, the transverse bores are disposed in a spaced relation along the bushing and in a plurality of series, the bores of one series alternating with those of the other series, as shown most clearly in Fig. 4. The corresponding alternating or staggered arrangement of the inner surfaces of the feeders results in a better distribution of the lubricant between the surfaces of the bushing and pin or shaft than would otherwise be possible.

It is preferred in the construction of the present bushing to bore the transverse apertures therethrough for the inserts or feeders, and then insert round pins of the material of which the feeders are to be made in said apertures, after which the bushing is formed with the longitudinal bore for the shaft or pin A': the last named operation serving not only to hollow out the bushing but also to remove from the feeders the parts thereof which intrude within the diameter required for the bore, thus assuring an accurate fitting of the feeders upon the shaft or pin.

From the foregoing, the structure and advantages of the present invention will fully appear; and it should be noted that while I regard the illustrated embodiment of the bushing to be preferable yet changes may be made in the details thereof, and the invention embodied in many various and apparently widely different forms of bushings without departing from its spirit or the scope of the subjoined claims. One slight modification is illustrated by Fig. 6, said figure illustrating supplemental apertures 40 formed in the parts 23 of the wall. The purpose of this modification is to show that it is not necessary to the spirit of the invention that the portions of the walls between the ends of the bores be wholly intact, provided enough of the outer wall is left, or other suitable provision is made, to hold the feeders against outward lateral displacement from the bores. Other modifications than this will readily suggest themselves and need not be herein particularly pointed out.

Having now described the invention what I believe to be new and desire to secure by Letters Patent, is:—

1. A bushing provided with a longitudinal opening to receive a shaft and a transverse opening substantially tangential to the shaft, said transverse opening extending through the bushing from one side of the periphery to the other and opening on its inner side to the longitudinal opening, in combination with a plug for feeding lubricant to the shaft longitudinally of the plug and through the inner lateral opening into the shaft opening, said plug being cut away on its inner side on the arc of the surface of the shaft at the lateral opening of the plug.

2. A bushing provided with a longitudinal opening to receive a shaft and transverse openings extending through the bushing from one side of the periphery to the other and opening on their inner sides into the longitudinal opening, in combination with plugs mounted in the transverse openings, for feeding lubricant to the shaft through the open inner sides of the transverse openings, said plugs being formed so that the course of least resistance to the passage of lubricant therethrough will be longitudinally of the plugs and being cut away on their inner sides within the open inner sides of the transverse openings.

3. A bushing provided with a longitudinal opening to receive a shaft and transverse openings extending through the bushing from side to side and opening on their inner sides to the longitudinal opening and closed on their outer sides, in combination with plugs mounted in the transverse openings, for feeding lubricant to the shaft through the open inner side of the latter, said plugs being arranged substantially tangential to the shaft when the parts are assembled and being formed between their ends with concave sections into which the shaft extends and from which the shaft receives the lubricant.

4. A bushing provided with a longitudinal opening to receive a shaft and a series of openings extending transversely through the bushing from side to side and arranged in a staggered relation, each of said transverse openings being laterally open between its ends to the longitudinal opening of the bushing, in combination with lubricant feeders mounted in said transverse openings and formed to conduct the lubricant longitudinally and to discharge the same between their ends, within the laterally open parts of the transverse openings.

5. A tubular bushing provided with a longitudinal opening to receive a shaft and transverse openings substantially tangential to the shaft, said transverse openings extending through the bushing from one side of the periphery to the other and opening laterally on their inner sides to the longitudinal opening, in combination with lubricant-feeding plugs mounted in the transverse openings, cut away at their ends on the arcs of the circumference of the bushing, and also having their middle portions cut away on their inner sides at the laterally open parts of the transverse openings and fitting transversely on the shaft when the parts are assembled.

6. In a device of the kind set forth, a body provided with an axial opening and a lubricant chamber, in combination with a bushing mounted in said axial opening and provided with a longitudinal opening and transverse openings, a shaft extending through said longitudinal opening and plugs mounted in said transverse openings and having their ends arranged to receive lubricant from said chamber, the transverse openings being laterally open on their inner sides and the portion of the plug in said laterally open part being cut away on the arc of the circle of the adjacent portion of the shaft and receiving the same.

7. In a device of the kind set forth, a body provided with an axial opening and a lubricant chamber, in combination with a bushing mounted in said axial opening and provided with a longitudinal opening and transverse openings, a shaft extending through said longitudinal opening and plugs mounted in said transverse openings and having their ends arranged to receive lubricant from said chamber, the transverse openings being laterally open on their inner sides and the portion of the plugs in said laterally-open parts being cut away on the arc of the circle of the adjacent portion of the shaft and receiving the same, said plugs being so formed that the course of least resistance to the passage of lubricant therethrough will be longitudinally of the plugs, the lubricant being discharged at the cut-away part intermediate the ends of the plug.

8. A bushing provided with a longitudinal opening to receive a shaft and a transverse opening substantially tangential to the shaft, said transverse opening extending through the bushing from one side of the periphery to the other and opening on its inner side to the longitudinal opening, in combination with a plug for feeding lubricant to the shaft longitudinally of the plug and through the inner lateral opening into the shaft opening, said plug being formed of wood cut longitudinally of the grain and being cut away on its inner side on the arc of the surface of the shaft at the lateral opening of the plug.

9. A bushing provided with a longitudinal opening to receive a shaft and a transverse opening substantially tangential to the shaft, said transverse opening extending through the bushing from one side of the periphery to the other and opening on its inner side to the longitudinal opening, in combination with a plug of wood filling the transverse opening, cut away at its ends on the arcs of the circumference of the bushing, and at its middle on its inner side at the lateral opening of the plug opening to fit transversely on the shaft when the parts are assembled.

In testimony whereof I have hereunto set my hand in presence of two subscribing witnesses.

JOHN CESSNA SHARP.

Witnesses:
J. E. TOUSLEY,
J. F. COOPER.